(12) United States Patent
Bonitatibus et al.

(10) Patent No.: US 11,293,801 B2
(45) Date of Patent: Apr. 5, 2022

(54) SYSTEM, APPARATUS AND METHOD FOR MONITORING, DETECTING AND/OR SENSING ONE OR MORE LIGHT BEAM CHARACTERISTICS

(71) Applicant: SOLAR LIGHT COMPANY, INC., Glenside, PA (US)

(72) Inventors: Michael H. Bonitatibus, Glenside, PA (US); Andrew F. Hmiel, Glenside, PA (US); Jay M. Silverman, Glenside, PA (US); Richard Withers, Glenside, PA (US)

(73) Assignee: SOLAR LIGHT COMPANY, LLC, Glenside, PA (US)

( * ) Notice: Subject to any disclaimer, the term of this patent is extended or adjusted under 35 U.S.C. 154(b) by 0 days.

(21) Appl. No.: 16/605,338

(22) PCT Filed: Apr. 16, 2018

(86) PCT No.: PCT/US2018/027757
§ 371 (c)(1),
(2) Date: Oct. 15, 2019

(87) PCT Pub. No.: WO2018/194968
PCT Pub. Date: Oct. 25, 2018

(65) Prior Publication Data
US 2020/0132543 A1 Apr. 30, 2020

Related U.S. Application Data

(60) Provisional application No. 62/486,285, filed on Apr. 17, 2017.

(51) Int. Cl.
*G01J 1/42* (2006.01)
*G01J 1/04* (2006.01)

(52) U.S. Cl.
CPC ........... *G01J 1/4257* (2013.01); *G01J 1/0414* (2013.01); *G01J 1/0422* (2013.01); *G01J 1/0474* (2013.01)

(58) Field of Classification Search
CPC ...... G01J 1/4257; G01J 1/0414; G01J 1/0422; G01J 1/0474
See application file for complete search history.

(56) References Cited

U.S. PATENT DOCUMENTS

| 4,257,676 A | 3/1981 | Greubel et al. |
| 4,357,486 A | 11/1982 | Blieden et al. |

(Continued)

FOREIGN PATENT DOCUMENTS

| CN | 205679315 U | 11/2016 |
| DE | 102014202294 A1 | 8/2015 |

(Continued)

OTHER PUBLICATIONS https://www.hamamatsu.com/resources/pdf/ssd/s2386_series_kspd1035e.pdf; Accessed Oct. 9, 2018.

(Continued)

*Primary Examiner* — Kevin K Pyo
(74) *Attorney, Agent, or Firm* — William J. McNichol, Jr.; Mark T. Vogelbacker (57) ABSTRACT

A device for collecting light from one or more incident light beams includes a first surface extending in a first plane and a second surface spaced-apart from the first surface. The second surface extends in a second plane parallel to the first plane. At least one of the first surface and the second surface including an optical polish or forming a reflective mirror coating. An edge surface extends from the first surface to the second surface. At least a portion of the edge surface forms a reflective mirror. At least one structure is formed in the first surface. The structure extends inwardly into the device from the first surface. The structure is configured to redirect light from a light source directed at the first surface.

20 Claims, 9 Drawing Sheets

(56) References Cited

U.S. PATENT DOCUMENTS 5,268,985 A    12/1993  Ando et al.
7,369,735 B2 * 5/2008  Nyhart, Jr. .......... G02B 6/0023
                                                       385/131
7,657,147 B2   2/2010  Bonitatibus et al.

FOREIGN PATENT DOCUMENTS

DE    10215004163 A1   10/2016
EP       2119531 A1    11/2009
EP       2346306 A1     7/2011

OTHER PUBLICATIONS https://oceanoptics.com/wp-content/uploads/OEM-Data-Sheet-USB2000-.pdf, Accessed Oct. 9, 2018.
https://www.hamamatsu.com/resources/pdf/ssd/g1115_etc_kgpd1002e.pdf; Accessed Oct. 9, 2018.
https://eoc-inc.com/wp-content/uploads/2019/04/genicom/GUVV-S10SD.pdf, Accessed Oct. 9, 2018.
R. Kitamura, et al., Optical constants of silica glass from extreme ultraviolet to far infrared at near room temperature, Applied Optics, Nov. 20, 2007, pp. 8118-8133, vol. 46, No. 33.
F. Sima, et al., Ultrafast Laser Fabrication of Functional Biochips: New Avenues for Exploring 3D Micro- and Nano-Environments, Micromachines 2017, 8, 40.
F. Serra, et al., Topological defects of nematic liquid crystals confined in porous networks, Soft Matter, 2011, 7, 10945-10950.
International Search Report for PCT/US2018/027757 dated Aug. 31, 2018.

\* cited by examiner

SYSTEM, APPARATUS AND METHOD FOR MONITORING, DETECTING AND/OR SENSING ONE OR MORE LIGHT BEAM CHARACTERISTICS

CROSS-REFERENCE TO RELATED APPLICATION

The present application claims priority to U.S. Provisional Patent Application No. 62/486,285, filed Apr. 17, 2017 and titled "System, Apparatus and Method for Monitoring, Detecting and/or Sensing One or More Light Beam Characteristics," the entire disclosure of which is incorporated by reference herein in its entirety.

FIELD

The present disclosures relates generally to the field of radiometry and electro-optics. In particular, in one embodiment, the present disclosure relates to the field of measurement of the transmission of a plurality of wavelengths of light, including infrared, visible and/or ultraviolet light, within a light guiding apparatus, such that the measurement of the light has a small and limited attenuation of the light within the light guiding apparatus.

BACKGROUND

Light sources are used in a myriad of applications, such as in dermatology, cosmetics development and the assessment of the efficacy of protective materials from the influence of solar radiation on human skin. Bright light sources, such as a xenon arc light source, are often employed to generate measurable effects. The light intensity preserving cross-section of a light guide is most optimally used to carry an intense beam of light to deliver it to a specific location for this work.

In the pursuit of improving the uniformity of the transferred beam of light, a device known as a homogenizer has been found effective. The simultaneous assessment of the light intensity is useful for feedback information to regulate the quantity of light being transferred. The light intensity measurement is also valuable to assess the dose being delivered by integrating the measured signal over time. Less effective means of capturing the light intensity of the light guide have been investigated and suffered from unacceptable variation of the measured signal if the light guide was moved. Other devices and methods have been used in the prior art, such as those disclosed in U.S. Pat. Nos. 4,257,676, 4,357,486 and 5,268,985, which are incorporated herein by reference in their entirety, but do not provide the functionality of the present disclosed technology.

SUMMARY

In one embodiment, the present disclosure is directed to a device for collecting light from an incident light beam for beam characterization purposes. The device can be designed to have the incident beam(s) pass-through a sensing element or region with minimum insertion loss or degradation of the incident beam. One of many purposes of the device is to monitor flux of a light beam uniformly across the profile of the beam. The device can include a wide-band optically transparent plate with micro-machined, light scattering features distributed across the face of one side. The side or edge face(s) of the device can be optically polished surfaces that extend perpendicularly to the plate faces. The edge face(s) can be coated with a suitable material to form a highly reflective internal mirror. At least one hole can be drilled from the edge of the device to form a signal sensing or diode port. In one embodiment, a plurality of spaced-apart sensing ports can be included. A bottom or distal end of the sensing port hole can be positioned outside of a diameter of the incident beam aperture. The light scattering features can divert a fraction of the incident beam into the plate volume by scattering. The plano surfaces and reflective edge mirror feature can trap redirected flux meeting the total internal reflection criteria for the scattered light within the plate, thereby creating the quantity of light flux that may be sampled for monitoring purposes.

In one embodiment, a cavity formed by the reflective edge(s) can serve to average the flux contributed by each light scattering feature by multiple internal reflections within the cavity. The geometrical pattern of the light scattering features can take any of a variety of forms, such as concentric circles, square grid patterns, logarithmically scaled patterns, and/or discretely placed individual points. The light scattering features can take the form of laser machined features, which can measure a few thousands of an inch in diameter and a few thousands of an inch deep with a near spherical bottom profile. The number and pattern of laser machined light scattering features can be configured to (i) minimize insertion loss, (ii) assess the uniformity of the beam profile, and/or (iii) assess the location of the beam within the confines of the disk. The number and pattern of laser machined light collecting features can be configured to maximize beam monitor accuracy. Some fraction of the scattered light can be redirected into the bulk of the plate via total interior reflections on the plate interfaces to be sampled at specific output ports with an intensity proportional to the average irradiance of the intercepted light.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings various illustrative embodiments. It should be understood, however, that the invention is not limited to the precise arrangements and instrumentalities shown. In the drawings.

DETAILED DESCRIPTION

Certain terminology is used in the following description for convenience only and is not limiting. The words "bottom," "top," "left," "right," "lower," "upper," "front" and "rear" designate directions in the drawings to which reference is made. Unless specifically set forth herein, the terms "a," "an" and "the" are not limited to one element, but instead should be read as meaning "at least one." The terminology includes the words noted above, derivatives thereof and words of similar import.

Referring to the drawings in detail, wherein like numerals indicate like elements throughout, in one embodiment the present disclosure is generally directed to a device, generally designated 10, configured to monitor, detect and/or sense one or more entire or partial beams or rays of light 12 passing therethrough. The device 10 can collect at least some light from an incident light beam (e.g., light that is incident on a planar surface) for beam characterization and measurement purposes, and can function with minimum insertion loss or degradation of the beam. More particularly, the device 10 can be configured to allow the maximum transmittance of the light beam(s) 12, while achieving a monitor signal directly proportional to the average intensity over a surface of the transmitting beam.

In one embodiment, the device 10 can intercept at least a portion of one or more light beams 12 directed thereon, and can permit at least a portion of the one or more light beams 12 to travel therethrough uninterrupted. For example, in one embodiment the device 10 can permit approximately 90-95% of the one or more light beams (e.g., incident light energy) to travel therethrough with no or minimal distortion. Thus, in one embodiment, insertion loss with the device 10 can be from 5-10%. In another example, Zemax® ray trace results show a 7.5-10% insertion loss with no anti-reflective (AR) coating applied to front or rear surfaces of the device 10. In this example, the insertion loss can be reduced with an AR coating. Generally, an AR coating can be optimized for a relatively narrow (e.g., 400 nm wide) band of operation.

The device 10 was conceived, at least in part, to solve a problem inherent with the use of fiber optic or liquid filled light guides. Nominally, the output irradiance of a light guide as measured across the output face of the guide is non-uniform. In the case of fiber guides, this can be caused by the non-uniform nature of the beam feeding the fiber bundle, by the irregular mapping of fibers from the entry to exit and by broken fibers due to handling issues. In the case of liquid light guides, the chaotic light path through the guide tends to create non-uniformity across the output end that will vary with the movement of the guide. Any attempt to monitor just a small, fixed area of the guide's output beam runs the risk of misreading the true irradiance of the guide. Attempts to use a beam splitting arrangement results in an insertion loss of at least 10%.

As described in detail below, in one embodiment, the device 10 is configured to turn or redirect a fraction of one or more light beams 12 extending therethrough toward a detection element (e.g., a sensor or a photodetector) for the purpose of assessing the intensity of the beam(s) 12. Although the device 10 can be used for entire beams of light 12, the device 10 can also be used for sub-beams or one or more portions or fractions of a beam of light.

The device 10 can be formed of any of a plurality of materials or combinations thereof. For example, the device 10 can be formed in whole or in part of fused silica, quartz, glass, molded plastic or any other material or combination thereof capable of or configured to transfer the light wavelengths of interest, which can be, but is not required to be, UV light. In one embodiment, the material of the device 10 is selected for low internal light attenuation and high transmission, such that any suitable material can be used. When specifying or considering the material to be used to form the device 10, at least two factors can help improve the effectiveness of the device 10. For example, it can be beneficial if the selected material is transmissive across the entire wavelength range of the light or radiation to be measured. Further, it can be beneficial if the material used has a high internal transmission to allow the light samples generated by the device's features to mix and reflect internally multiple times to get an averaged reading proportional to the total beam irradiance. This can be especially true for relatively large devices 10, where the internal light paths can take on large enough lengths that internal losses due to attenuation along the internal optical path become a dominate consideration. High purity fused silica material has a 99.9% internal transmission over a very wide transmission band, making it one of possibly several ideal choices for the device 10.

The device 10 can have a circular shape and/or be in the form of a disk, with a diameter that is an optimal fraction larger than the size of the light beam(s) 12 it is intended to monitor or sense. For example, the device 10 can have a diameter of approximately 10 mm and have a thickness of approximately 1 mm. However, the device 10 can be in other shapes, sizes, configurations or forms, such as a square shape or any other appropriate shape that has a prescribed area and thickness. The device 10 can be a solid structure or solid optical component formed of the selected material. Alternatively, the device 10 can be a low profile optical component that acts like an integrating sphere, but without the physical bulk or the complex coating required of integrating spheres.

The device 10 can include a first or front face 14, an opposing second or rear face 16, and at least one edge surface 18 extending therebetween. Either or both of the front and rear faces 14, 16 can be flat or planar. The front face 14 can extend parallel to the rear face 16. The front face 14 and/or the rear face 16 can have a high optical polish and/or be polished to full optical clarity and devoid of any coloration, pigmentation and shading. In one embodiment, the optical polish applied to one or both of the faces 14, 16 can be determined by the requirements of whatever optical system the device 10 has been incorporated into.

In the embodiment where the device 10 is in the form of a disk, the edge surface 18 can extend around an entire periphery of the device 10, and at any given point the edge surface 18 can extend perpendicularly to both the first and second faces 14, 16. In the embodiment where the device 10 is in the form of a block or square, the at least one edge surface 18 can be four edge surfaces, each of which can extend perpendicularly to the two adjacent edge surfaces and perpendicularly to the first and second faces 14, 16.

A high optical polish can be applied to, built into and/or formed in a portion or the entirety of each edge surface 18. The polish can optimize internal reflection of the device 10. The lower the quality of polish used, the more the internally reflected light will be lost to diffusion at the plano surfaces 14, 16. In one embodiment, a polish with a surface quality of 60-40 can be used. In one embodiment, a polish with a surface quality of 20-30 can be used. In one embodiment, a polish with a surface quality of 10-5 can be used. Alternatively, the high optical polish can be formed on each edge surface 18. The edge surface(s) 18 of the device 10 can be coated by any number of specific processes that creates a high reflectivity mirror for total internal reflection. In one embodiment, the coating can be applied after or on top of the polish. The coating can include aluminum, silver and/or gold, and/or any other appropriate material based on the wavelength being measured, for example. To facilitate mounting of the device 10, the mirror coating on the edge surface 18 can be protected with a silicon dioxide coating with an Inconel final or top coat.

One or a plurality of spaced-apart structures 20 can be formed on or in one or both of the faces 14, 16 of the device 10. Each structure 20 may be referred to herein as a "scattering structure" or "scattering feature". At least a portion of one or each structure 20 can be considered a light collecting feature. Each of the plurality of spaced-apart structures 20 can have the same size and shape, or a different size and/or shape. Each structure 20 can be in the form of any one of a variety of shapes, such as at least a portion of a square, a rectangle, a "V" shape, a line (e.g., formed of one or more straight or angled portions), a circle (e.g., a hemisphere), an oval, etc. In operation of one embodiment, incident light can be introduced to each structure 20 at a particular angle or range of angles. Light rays diffused by the structure 20 can be trapped internally if the angle with regard to the plano surfaces 14, 16 meets the total internal reflection criteria determined by Snell's Law for the optical materials involved. The beam(s) 12 or portion(s) thereof that do meet the total internal reflectance criteria can travel through the device 10 and out the rear face 16.

In one embodiment, there can be a minimum density of number or concentration of structures 20 in a given device to accurately measure or monitor the light beam(s) 12. The inventors determined the minimum density empirically using several physically different liquid light guide (LLG) models. An aggregated study was conducted using the LLG models as components in a number of Zemax® ray traces. Various configurations (e.g., size, spacing, pattern, etc.) of the structures 20 were tested until the error between the raw LLG model outputs were detected with 2% or less error.

Figure 7:
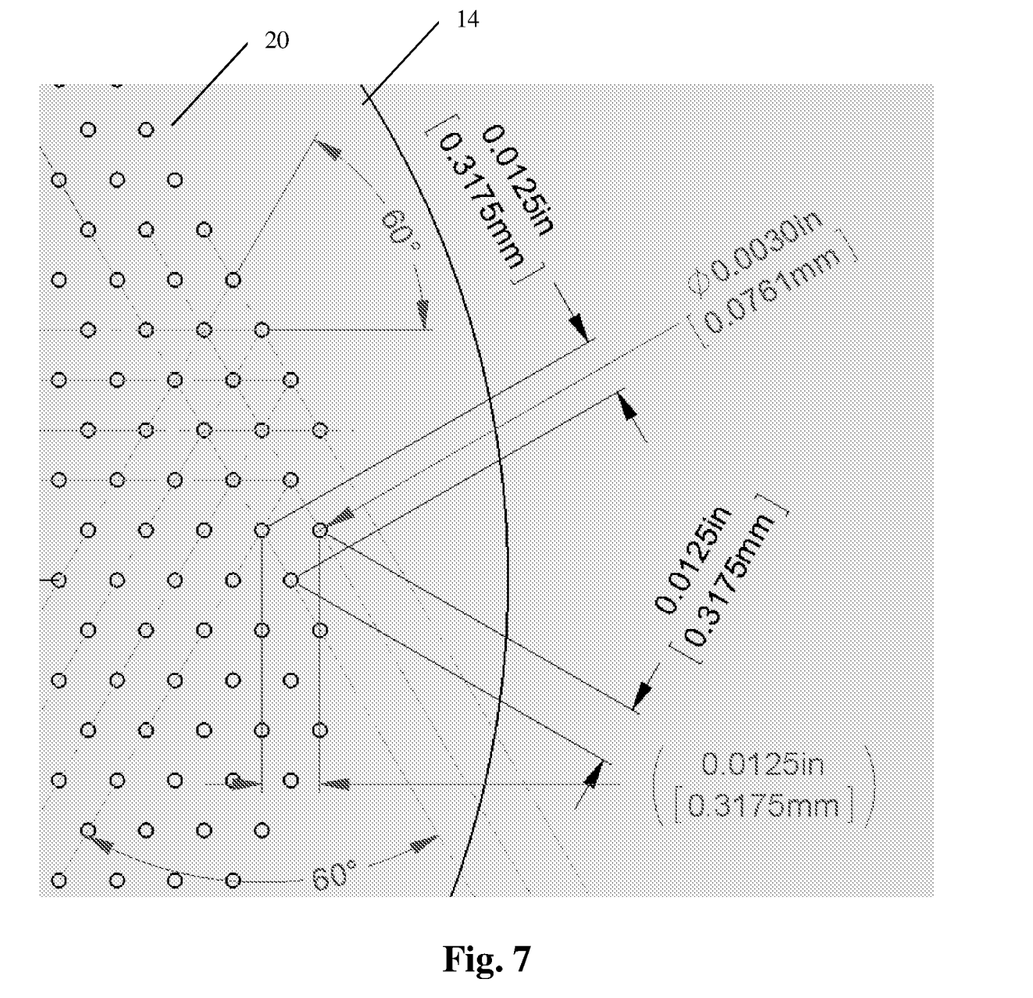
FIG. 7 is a magnified view of a portion of the device according to one embodiment of the present disclosure.

In the same or another embodiment, there can be a minimum spacing between to the structures 20 to accurately measure or monitor the light beam(s) 18. For example, as shown in FIG. 7 and in the case of the LLG system, the structures 20 can have a diameter of approximately 0.003 inches and approximately 0.0125 inches on centers. The phrase "on centers" can refer to the distance between the vertices of two adjacent structures 20. The presently disclosed technology is not limited to the inclusion of structures 20 with the above-described size or spacing. For example, adjacent structures 20 can have different sizes (e.g., diameters), and a first pair of adjacent structures 20 can be closer together than a second pair of adjacent structures 20.

In one embodiment, the determination of structure size and spacing can be defined by the anticipated non-uniformity of the light source. Good uniformity characteristics can allow wider spacing of the structures 20 (e.g., fewer structures 20 on the front face 14 of the device) to get accurate irradiance values. The intensity of the light source (e.g., higher irradiance) can mean smaller structure 20 size to get the same detector signal and the desired accuracy required for the system measurement. The greater the total area occupied by the structure(s) 20, then the less light makes it through the device 10 uninterrupted, thereby resulting in more insertion loss. When using one or more light beams 12 of relatively high intensity, less and/or smaller structures 20 provide the desired outcome. When using one or more light beams 12 of relatively low intensity, more and/or larger structures 20 can provide the desired outcome. In one embodiment, it can be desirable to limit the number and/or size of the structures 20 so that the least amount of the light beam is interrupted by the device 10.

In one embodiment, the structures 20 can be formed by the removal of a portion of the device material. Thus, one or more of the structures 20 can be a pit, a groove or a hole formed in at least one of the front and rear faces 14, 16 of the device 10. Alternatively, one or more of the structures 20 can be a scribe formed in at least one of the front and rear faces 14, 16 of the device 10. The structures 20 can be arranged in the form of a grid or a geometric pattern, for example, on or in one or both of the front and rear faces 14, 16. The structures 20 can be formed in any of a variety of ways, such as by use of a laser, mechanical drilling, etching, scribing and the like.

The structures 20 can be spaced-apart across the front and/or rear faces 14, 16, and the outer-most structures 20 can be spaced-apart at least slightly inwardly from the edge surface(s) 18 of the device 10. In one embodiment, the structures 20 can cover or be positioned at the midportion or central clear aperture of the device 10. Thus, the annulus or perimeter around the edge of the device 10 is not covered with structures 20, which serves to protect the diode/sensing port(s) (described in detail below) from incident light impinging on the drilled sensing port hole. Otherwise, the summing action of the contributions from each structure 20 or sensing feature could be distorted. In one embodiment, anything that touches the front and/or rear faces 14, 16 of the device 10 will "pull" light energy out of the cavity, thereby decreasing the output signal. The mirror coating will preserve the required reflectivity of the front and rear faces 14, 16 where mounting materials (e.g., adhesive, mounting clips, etc.) touch or contact the device 10.

In one embodiment, at least a portion or an entirety of the inside surface of each structure 20 is rough or non-smooth so as to produce light diffusion. The roughness can be the result of any of a variety of processes, such as femtosecond laser machining, as provided by Spectra-Physics® of Santa Clara, Calif. or as discussed in "Supplementary materials to the paper *Topological defects of nematic liquid crystals confined in porous networks*," by F. Serra, et al., published Sep. 7, 2011 in *Soft Matter,* 2011, 7, 10945-10950, which is incorporated by reference herein in its entirety. The rough surface(s) and/or portion(s) can be what deflects at least some of the light traveling through the device 10. For example, in one embodiment, a femtosecond laser pulse can be directed at and can hit or contact material interior to the fused silica bulk material of the device. 10. Localized cracks can be formed inside the device 10 and can act as diffusion features.

The depth of each structure 20 within the respective face 14, 16 can be the minimum depth required to create sufficient internally reflected light as the light beam(s) 12 scatters off interior surfaces at a boundary of the device 10 and is reflected internally within a volume of the device 10. In one embodiment, each structure 20 can measure, for example, a few thousandths of an inch in diameter and few thousandths of an inch deep (i.e., into the device 10) with an ideally near spherical bottom profile. In one example, each structure 20 can measure approximately 0.003 inches in diameter and approximately 0.0025 inches deep.

In one embodiment, one or more spots of an optically active material (OAM) can be applied to and/or be placed in the one or more of the plurality of spaced-apart structures 20. The spot(s) can act to trap at least some of the light from the beam(s) 12. In one embodiment, the OAM can completely or substantially fill one or more of the structures 20. The OAM can be formed of or include fluorescent material, for example, though any suitable OAM can be used. Thus, the device 10 can be used as an alignment tool with spaced-apart dots applied or distributed in a predetermined pattern or manner on at least one or both of the front and rear faces 14, 16. Thus, the device 10 can be used to sense light of wavelengths not easily detected with standard photodiodes and detectors, by selecting material that fluoresces in the visible range it would be possible to detect short wavelength Ultraviolet light not easily detected with standard detectors using a readily available visible light detector. The spots can be applied by squeegeeing the OAM on the desired face(s) of the device, allowing the OAM to harden, and then polishing the OAM and/or the desired face(s) 14, 16 of the device 10 to remove unwanted residual.

In one embodiment, the density (e.g., number) and location (e.g. position) of the array of structures 20 on or in the device 10 can be arranged to minimize an error of the measurement of the average intensity across the light beam(s) 12 and/or minimize insertion loss. Insertion loss of the beam intensity through the device 10 can be determined by the typical reflection losses at the surface(s) of the device 10, with some additional value of loss depending on the quantity of and spatial location of the structures 20. In one embodiment, the density and location of the array of structures 20 on or in the device 10 can be configured to maximize beam monitor accuracy, to sample a selected sub-area or sub-areas of incident beam profile, and/or to confirm spatial extent, position or alignment of incident beam profile in the device 10.

The device 10 can include one or more spaced-apart ports or pickup locations 22, such as a hole or passageway, formed on or in at least one of the edge surfaces 18. Each pickup location 22 can be drilled, for example, into the edge surface 18 of device 10 to form a signal sensing port. Thus, the pick-up location can extend radially inwardly toward a geometric center of the device 10. A distal end of each pickup location 22 can be positioned outside of the diameter of the light beam 18 in order to monitor the measured signal. A photodiode or other sensor can be coupled to one or each of the pickup locations. Optionally, a sensor can be positioned coaxially or substantially coaxially (e.g., within 15 degrees of exactly coaxially) to one of the pickup locations 22. At an outer end of one or each of the pickup locations 22, an end of an optical fiber may also be used to re-direct the light signal scattered from the structure(s) 20 to a remotely located detector. Thus, the exterior of the device 10 can include or be attached to a plurality of sensors configured to detect a multitude of wavelength ranges of interest. As an example of an alternative to fiber optic interconnections, a digital inter-board communication pathway could be implemented by stacking the devices 10 and aligning the optical axis to create bi-directional, free space optical data pathway. In one implementation, one or more of the devices 10 can be placed between circuit boards having no electrical connection. The article titled "Ultrafast Laser Fabrication of Functional Biochips: New Avenues for Exploring 3D Micro- and Nano-Environments" by F. Sima, et al., published Jan. 28, 2017 in *Micromachines* 2017, 8, 40; doi:10.3390/mi8020040 is incorporated by reference herein in its entirety.

One exemplary configuration of the device 10 can include a hexagonal array of the scattering structures 20, wherein the array can be arranged so as to provide sufficient density per unit area to meet monitoring accuracy requirements. For example, the device 10 can include five hundred ninety five (595) laser-drilled structures 20, arranged in a hexagonal pattern, that cover a sensing area having a diameter of approximately 8 mm on the front face 14. Arrays of structures 20 of other shapes could also be employed, such as pentagonal or octagonal.

In another example, the device 10 can include a coating on or at the bottoms of the structure(s) 20 with a material that fluoresces, thereupon shifting the wavelengths of the scattered light, for alternative capabilities of the beam intensity detection. One example of the alternative capabilities is to arrange the array of structures 20 in one or more spaced-apart concentric circles, and employing two or more fluorescing materials located on or at the bottom of the structure(s) 20, such that the fluorescing wavelength would increase or decrease with increasing distance from the center of the device 10, thereby yielding a means, using multiple detectors we would be able to determine the size of the beam. In one embodiment, employing one or more concentric circles of the structures 20, adjacent or different concentric circles could contain different materials in the structures 20. Depending upon the light contacting the structures 20, different feedback can be provided. In one embodiment, quantum dots (QD), made of a semi-conductor material, can be used in or with the structure(s) to detect difficult-to-measure wavelengths.

In one embodiment, the device 10 can be positioned in or mounted in or to a block, such as block 42 shown in FIG. 5A of U.S. Pat. No. 7,657,147 assigned to Solar Light Company, Inc., the disclosure of which is incorporated by reference herein in its entirety. The device 10 can be mounted in the block transverse to the beam of light 12 passing to a homogenizer unit. In one embodiment, this device 10 can be designed to be mounted along the edge surface 18. Any material contacting the planar faces 14, 16 will allow trapped light to escape. To prevent trapped light from escaping, a reflective mirror coating can be applied to one or both of the front and rear faces 14, 16 and surrounding the clear aperture. This can provide more flexibility in mounting the device 10.

Figure 8:
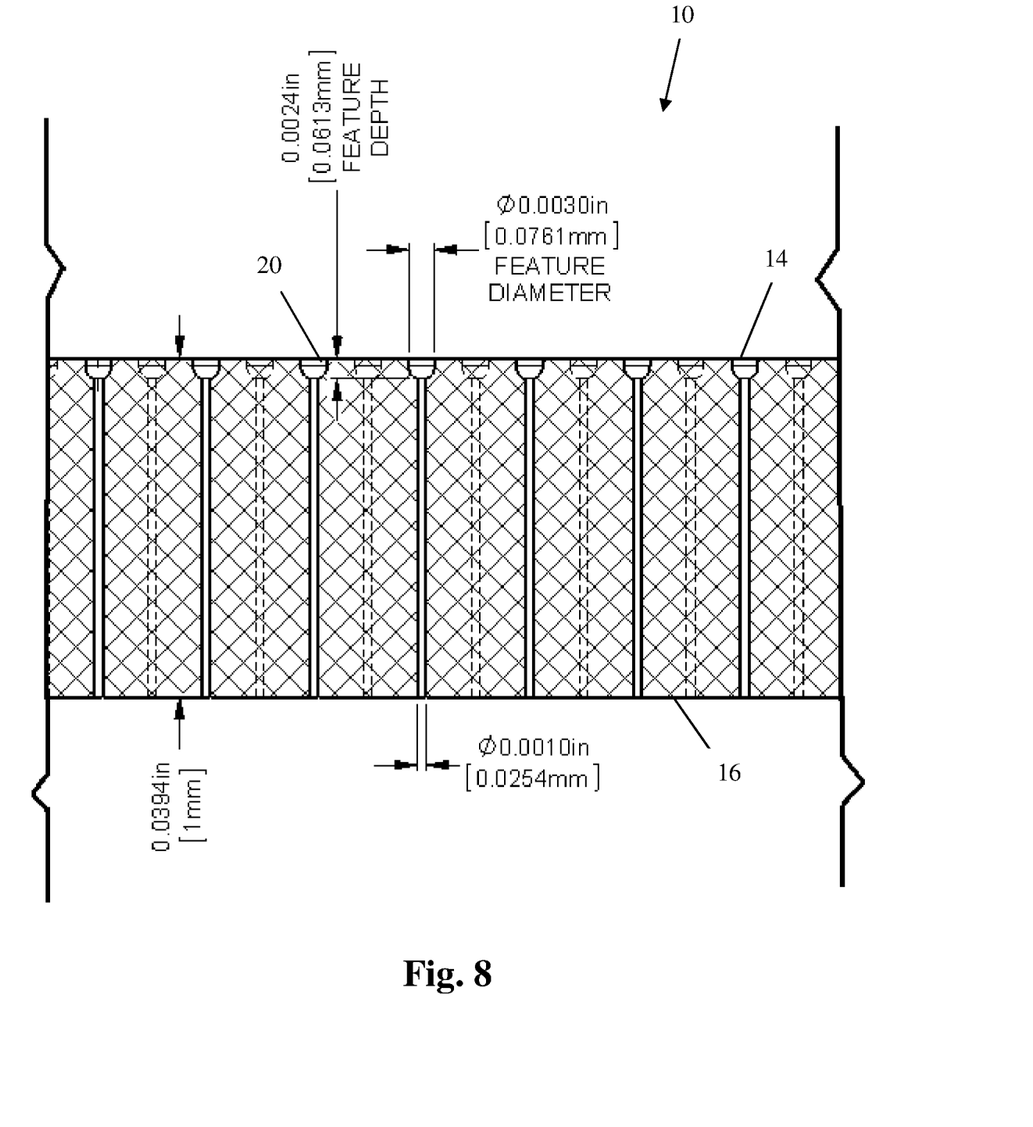
FIG. 8 is a magnified view of a portion of the device according to one embodiment of the present disclosure.
Figure 9:
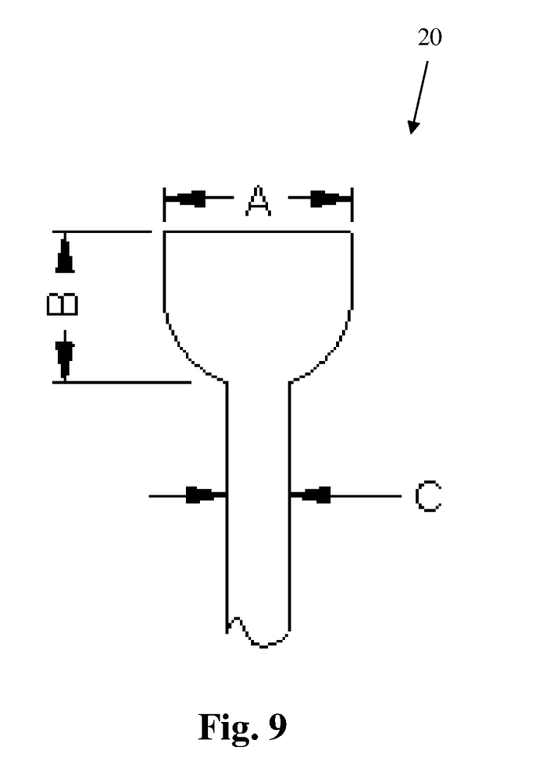
FIG. 9 is a further magnified view of one aspect of the device shown in FIG. 8.

Referring to FIGS. 8 and 9, another embodiment is to laser drill micrometer sized holes in the center of the divot(s) 20 to serve as a means to attenuating light being picked up by the sensors. There will be fewer reflections on the edge of the divots 20, which will produce a lower signal. This can be used to reduce sensor saturation in the case where signal throughput exceeds sensor range. Additionally, these holes in the divots 20 will allow more light to pass through the surface of the device 10 with normal incidence and help to mitigate signal process losses as a result of inline sensing. As shown in FIG. 9, the dimension of light path "C" can be varied throughout the sensor to reduce the losses in the entry and exit through the sensor material. The larger the dimension cross sectional area "C", the less overall light that will be attenuated through the structure. Typical losses are 4% per surface for a total of 8%. Therefore, by increasing the dimension cross sectional area "C" some of those losses can be mitigated thereby increasing the efficiency of the light source delivery system.

The width "A" of the divot 20 in the front surface of the device facing the light source (see FIG. 9) can vary to provide an effect of attenuating the signal being measured at the edge(s) of the sensor. Higher attenuation will call for the use of a more sensitive apparatus, while less attenuation will call for less sensitive apparatus. Attenuation and sensor sensitivity can be paired to optimize the functionality of the device. A larger width "A" will collect more light and an electrical circuit with a lower sensor gain or optical connector and optic with reduced transmission characteristics will be required to provide a meaningful signal for processing. A smaller width "A" will reduce the light being collected and an electrical circuit with a larger sensor gain or optical connector and optic with increased transmission characteristics will be required to transmit the signal.

As an example, a use case for determining the proper values for "A" and/or "B" dimensions in FIG. 9 is if a light source is extremely intense where the device materials may be saturated with signal or conversely where the device is not sensitive enough. Specifically, a more intense source will need smaller dimensioned structures to get a usable monitor signal. This is the same concept as attenuating the signal but functionally by reducing the ratio of total structures in area to the clear aperture area. Increasing the depth of the structure(s) 20 can impact the averaging functionality of the device 10, thereby reducing the accuracy of the device 10.

In operation of one embodiment, the device 10 can use the principle of total internal reflection (TIR) to trap and mix the light energy collected by the structure(s) 20 on the front face 14. The planar faces 14, 16 of the device 10 can trap light with incident angles less than the Snell angle for the device's material and the surrounding medium (e.g., air). Assuming the index of refraction ($n_1$) for fused silica is 1.477 at 350 nm, and the index of refraction ($n_2$) for air is 1, the ray(s) is/are assumed to travel from material $n_1$ to material $n_2$: Critical angle=Arcsin($n_2/n_1$)=Arcsin(1/1.477)=42.6 degree (from surface normal) or 47.4 degrees from the planar surface. All internal rays with an incident angle to the parallel planar surfaces less than 47.4 degrees can be trapped between the faces 14, 16. Angles greater than 47.4 will pass out of the face(s) 14, 16 of the fused silica. Rays of 47.4 degrees or less can be trapped in the cavity formed by the planar faces 14, 16 and the polished and mirror coated rim face 18. These rays can bounce around internally, mixing with multiple internal reflections.

In one embodiment, a device 10 having a diameter of approximately 10 mm can have a clear aperture of approximately 8 mm, which has an area of 50.26 mm². The device can have 595 structures 20, each having a diameter of 0.003 inches. The structures 20 can have a total area of 2.71 mm². Such a configuration can result in approximately 5.4% of the clear aperture being covered with the structures 20.

In use, two or more of the devices 10 can be stacked on a common axis or inline. More particularly, the two or more devices 10 could be spaced-apart in series. In one embodiment, three or four detectors can be employed. Two or more devices 10 could be aligned in series for multiple measurements. Feedback or information obtained from each device 10 can be used to determine a different characteristic (e.g., wavelength, energy, position or alignment of the beam, etc.) of the light traveling through the device(s) 10. In one embodiment, multiple devices 10 aligned spatially can form a light fence line of arbitrary length with laser driven excitation. Multiple devices 10 spaced horizontally or vertically can create an extended virtual fence with indication of intrusion localized to the closest device 10 location.

The device 10 of one embodiment of the present disclosure was tested to determine its effectiveness. The task was to monitor the total irradiance out of a light guide with minimum insertion loss and high accuracy. Multiple, representative liquid light guide physical models were created and used as components in the Zemax® ray trace model. Various configurations of structure sizes, numbers and patterns were considered on the TIR plate to get a minimum error for the irradiance measurement from the diode port irradiance compared to the irradiance measured at the end of the liquid light guide. The physical constraints dictated a compact assembly that could be slipped between existing components in the optical path. A correlation of 2% or better was found for the TIR plate as configured. Bench testing confirmed that the movement of the liquid light guide did not degrade the quality of the measurements.

Figure 1:
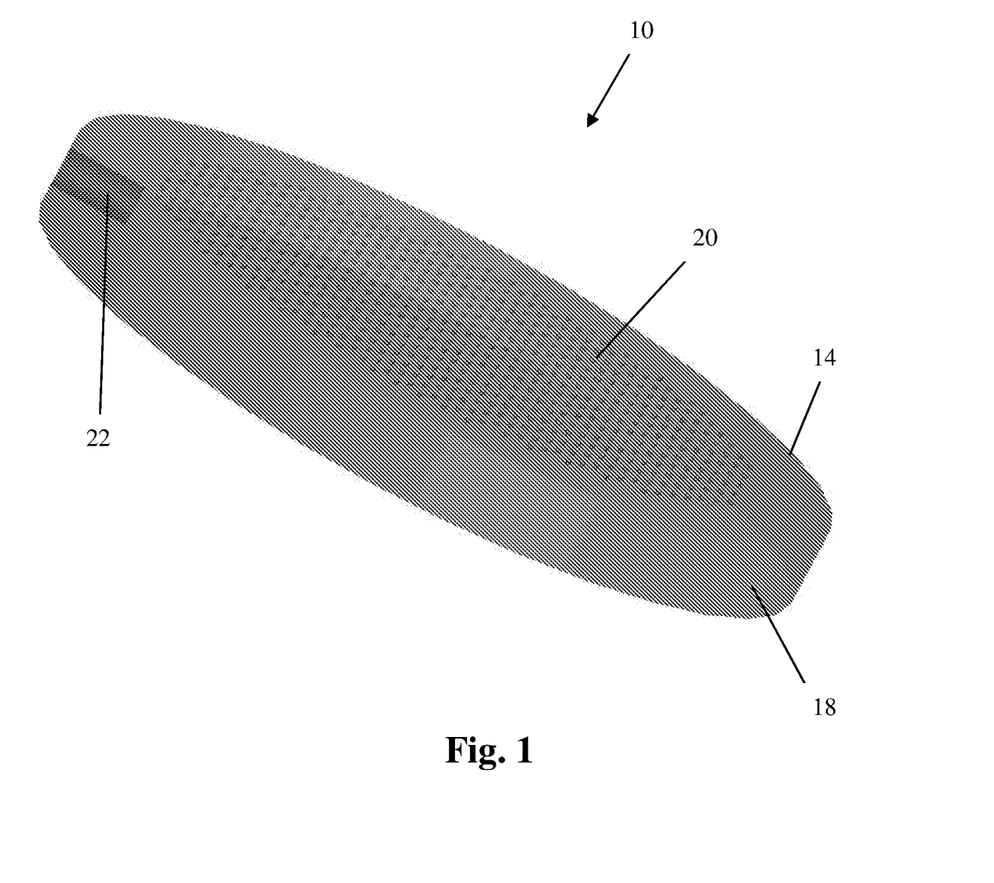
FIG. 1 is a perspective view of a device according an embodiment of the present disclosure.
Figure 2:
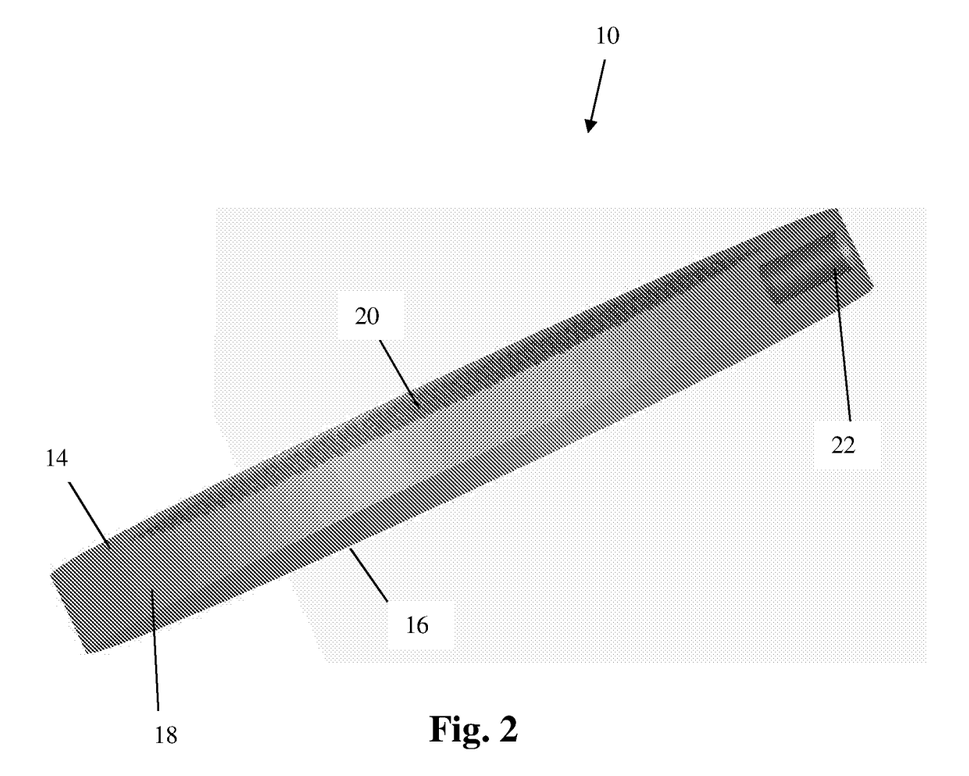
FIG. 2 is another perspective view of the device shown in FIG. 1.
Figure 3:
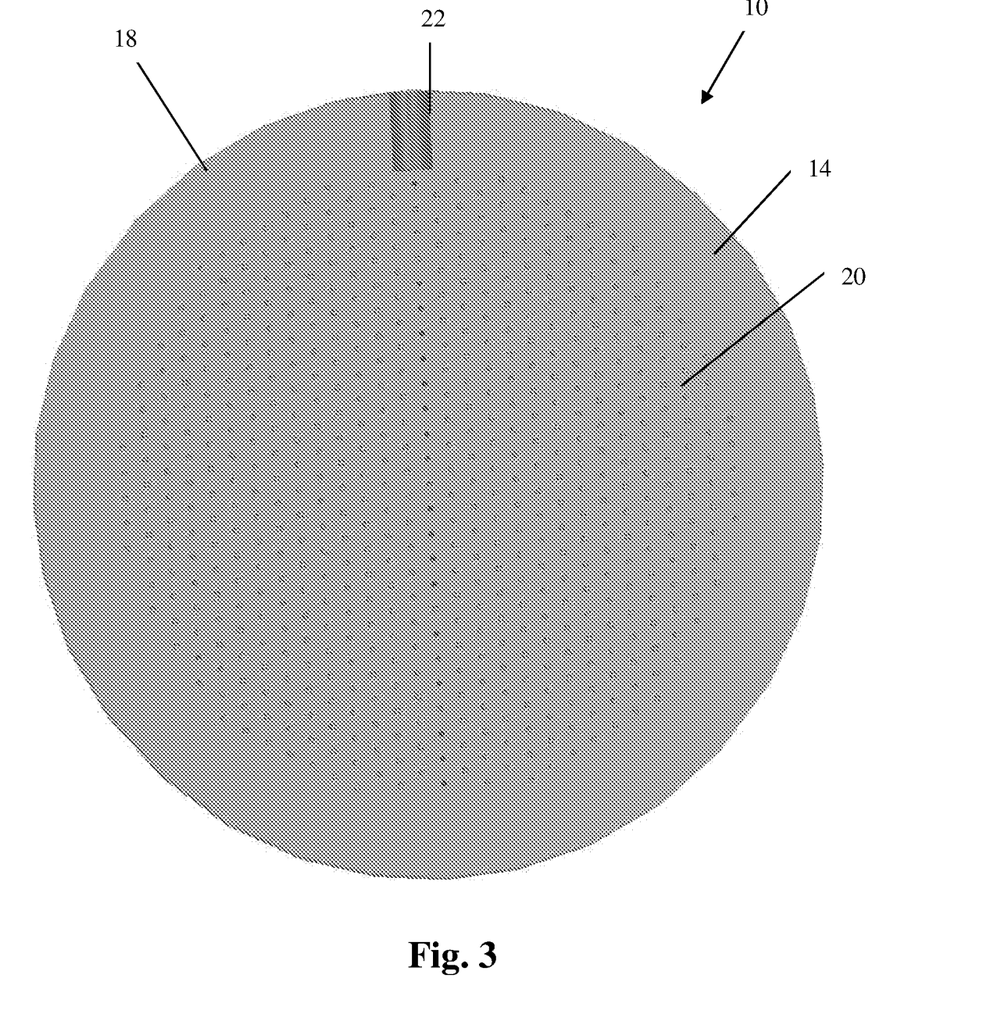
FIG. 3 is top plan view of the device shown in FIG. 1.
Figure 4:
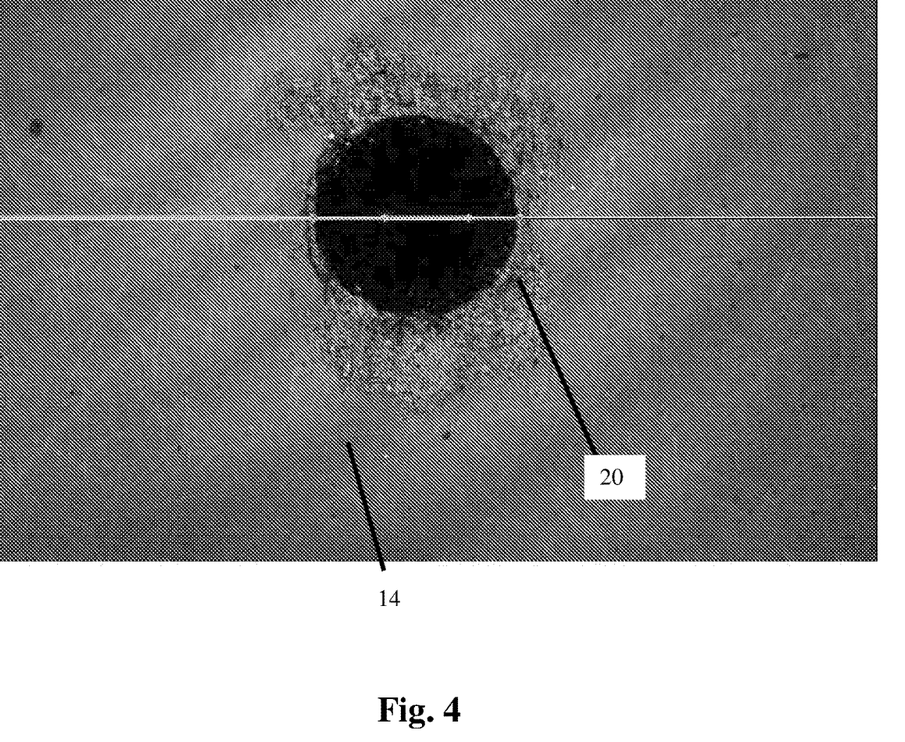
FIG. 4 is a representation of a microphotograph of a structure formed in the device shown in FIG. 1, wherein a cross line has been added to the representation and used to determine the internal profile of the structure.
Figure 5:
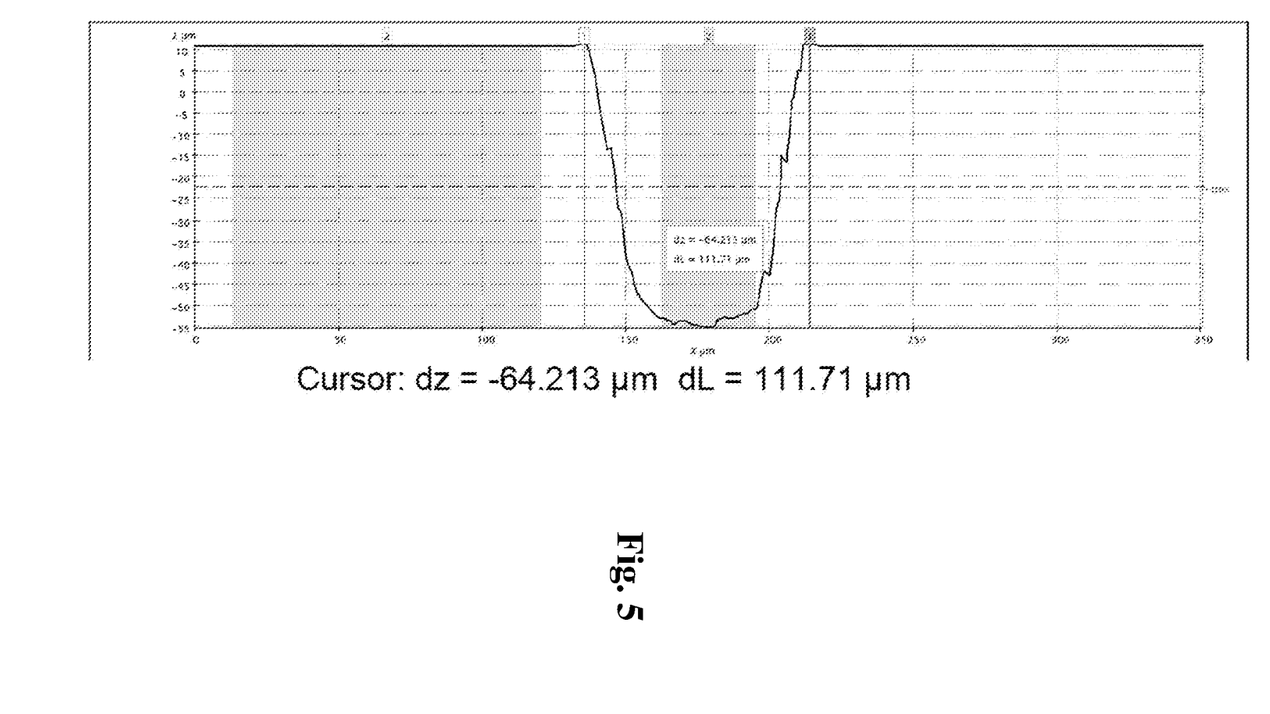
FIG. 5 is a graph depicting a profile of the structure at the cross line shown in FIG. 4.

FIG. 4 shows an interferometer quality control (QC) measurement of a laser drilled structure 20 in a device 10 formed of fused silica. The material surrounding the structure 20 in FIG. 4 is ejected from the laser drilling process and is easily washed off before assembly. The non-uniform features shown on the interior of the sample structures 20 can be beneficial to the operation of the device 10. These features constitute a multiplicity of potential scattering points. All light scattered with angles less than the Snell angle TIR value are trapped internally. All other light will pass through the device 10. The graph of FIG. 5 shows the profile of a laser drilled hole along the line indicated in FIG. 4. The slope and/or shape of the inner surface of each surface 20 can be important. The discontinuities (e.g., non-linear points or spikes) along the surface of the structure 20 act to diffuse light into the device 10. The slope can intercept at least a portion of the incident beam(s) directed onto the device 10. In one embodiment, the slope is not vertical (i.e., not ninety degrees with respect to the front face 14). It can be beneficial to have a more shallow slope (e.g., closer to zero degrees or closer to parallel with the front face 14) of the inner surface of each structure 20.

Figure 6:
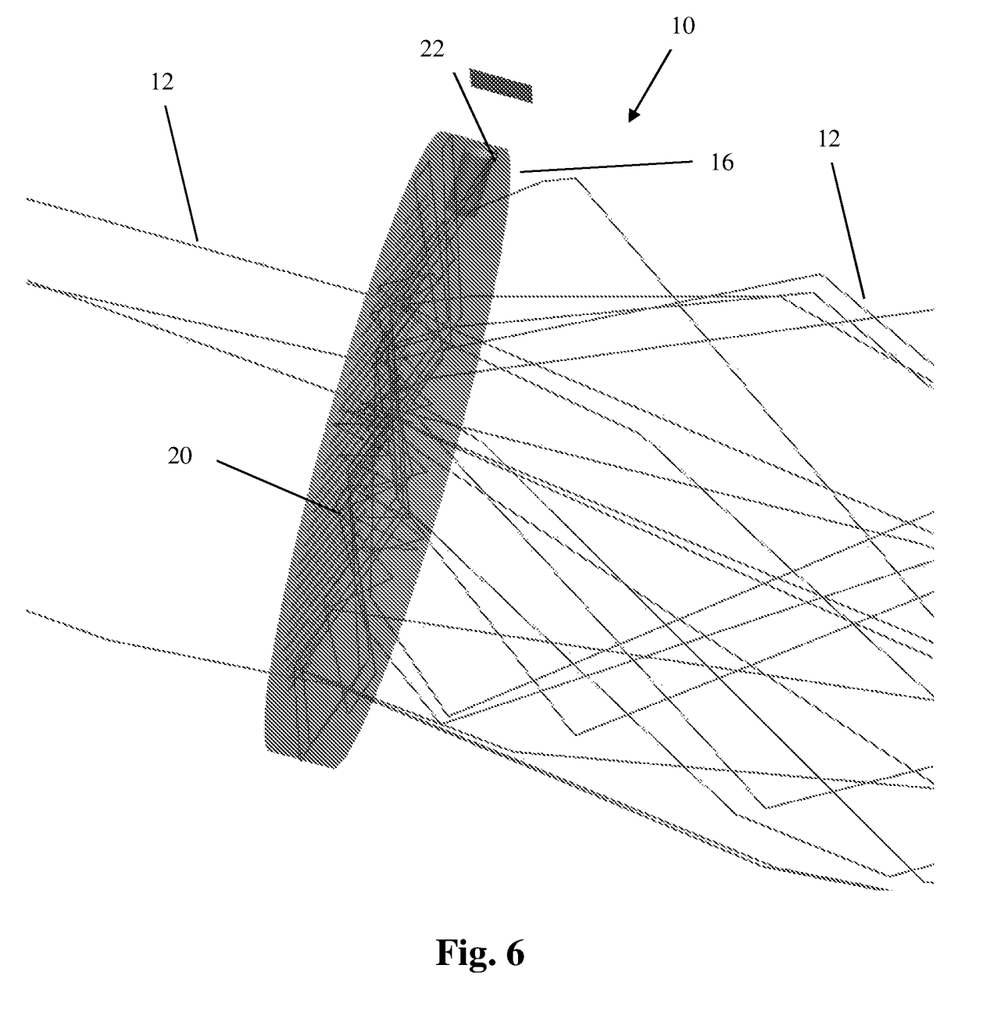
FIG. 6 is a perspective view of the device shown in FIG. 1, wherein one result is shown when light is directed onto the device, and wherein at least certain optical components that can be used in conjunction with the device are not shown for sake of clarity.

FIG. 6 shows a simplified ray trace of the TIR device 10 in an optical light path. The optical components typically associated with or used in conjunction with the device 10 are not shown for simplicity and clarity, and a selection filter has been applied to raytrace results in FIG. 6 to show only a subset of rays 12 that have contacted the structures 20. Thus, the bending effect shown on the light rays 12 on the right hand side of FIG. 6 are a result of a homogenizer or other structure that is adjacent to the device 10, but is not shown in FIG. 6 for simplicity and clarity.

As shown in FIG. 6, incident light enters from left and exits to right. The diode sensing port 22 is located at top of device 10. The horizontal light path denotes the incident beam(s) 12 passing through the device 10. The vertical rays 12 inside the device 10 have been trapped by Snell law based on total internal reflection. The raytrace image shown in FIG. 6 exemplifies the extent that internally trapped light is mixed by multiple reflections. After interacting or contacting the structures 20, the incident rays 12 scatter as some are trapped internally (moving in the vertical plane, for example, perpendicular to the path of the rays) and others pass through the device 10. In one embodiment, a relatively small subset of the ray(s) 12 will reach or end up at the port 22. In practice, the relative density of trapped rays 12 versus the pass-through rays 12 can be less than that shown in FIG. 6.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An apparatus for measuring characteristics of light, the apparatus comprising:
   a sensor configured to measure characteristics of light, the characteristics of light including at least one of intensity or wavelength; and
   a device comprising:
      a first surface extending in a first plane;
      a second surface spaced-apart from the first surface, the second surface extending in a second plane, the second plane extending parallel to the first plane, at least one of the first surface and the second surface including an optical polish or forming a reflective mirror coating;
      an edge surface extending from the first surface to the second surface, at least a portion of the edge surface forming a reflective mirror; and
      at least one structure formed in the first surface, the structure extending inwardly into the device from the first surface, the structure being configured to redirect light from a light source directed at the first surface to the sensor.

2. The apparatus of claim 1, further comprising:
   at least one hole extending from the edge surface toward a geometric center of the device, the hole being configured to receive at least a portion of the sensor therein.

3. The apparatus of claim 1, wherein a surface of the structure is rough to produce light diffusion.

4. The apparatus of claim 3, wherein at least a portion of the surface of the structure includes a coating of fluorescent material.

5. The apparatus of claim 1, wherein the at least one structure includes a plurality of spaced-apart structures.

6. The apparatus of claim 5, wherein the plurality of spaced-apart structures are arranged in a pattern on the first surface, each of the structures being spaced-apart from the edge surface.

7. The apparatus of claim 6, wherein the pattern is hexagonal.

8. The apparatus of claim 5, wherein each structure has the same size and shape.

9. The apparatus of claim 5, wherein two or more structures of the plurality of spaced-apart structures have a different size or shape.

10. The apparatus of claim 5, wherein the structure can be configured to redirect at least one ray of light directed to the first surface internally to the device if the angle with regard to the first surface meets the total internal reflection criteria determined by Snell's Law.

11. The apparatus of claim 5, wherein the device is in the form of a disk, the disk having a diameter of approximately 10 mm and a thickness of approximately 1 mm, the disk being formed of at least one of fused silica, quartz, glass and molded plastic.

12. The apparatus of claim 5, wherein the edge surface has a length of approximately 1 mm as measured from the first surface to the second surface.

13. The apparatus of claim 1, wherein the entire structure is spaced-apart from the second surface.

14. The apparatus of claim 1, wherein localized cracks are formed inside the device and act as a diffusion feature.

15. A method for collecting light from one or more incident light beams to sense one or more characteristics of the one or more light beams, the method comprising:
   receiving light from one or more incident light beams in a device having (a) a first surface with a plurality of spaced-apart structures in the first surface, each of the plurality of spaced-apart structures extending inwardly into the device from the first surface, (b) a second surface, the first surface extending in a plane that is parallel to a plane defined by the second surface, the second surface being spaced-apart from the first surface, and (c) an edge surface extending from the first surface to the second surface;
   directing at least some of the light to a sensor at least partially positioned in a hole formed in the edge surface of the device, the sensor being configured to measure characteristics of the light, the characteristics of light including at least one of intensity or wavelength; and
   sensing characteristics of the light directed to the sensor.

16. The method of claim 15, wherein the plurality of spaced-apart structures are arranged in a pattern on the first surface, and wherein the pattern is hexagonal.

17. The method of claim 16, wherein the device is in the form of a disk, the disk having a diameter of approximately 10 mm and a thickness of approximately 1 mm, the disk being formed of at least one of fused silica, quartz, glass and molded plastic.

18. The method of claim 16, further comprising:
   placing the device in a block such that the device is positioned transverse to the direction of the light from the light source.

19. The apparatus of claim 1, wherein the characteristic is selected from the group consisting of: irradiance and wavelength.

20. The method of claim 15, wherein the characteristic is selected from the group consisting of: irradiance and wavelength.

* * * * *